United States Patent Office 2,920,910
Patented Jan. 12, 1960

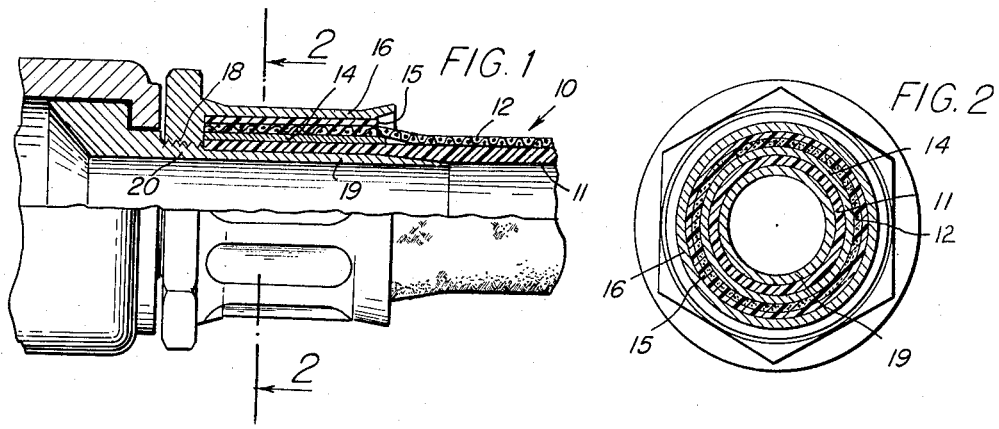
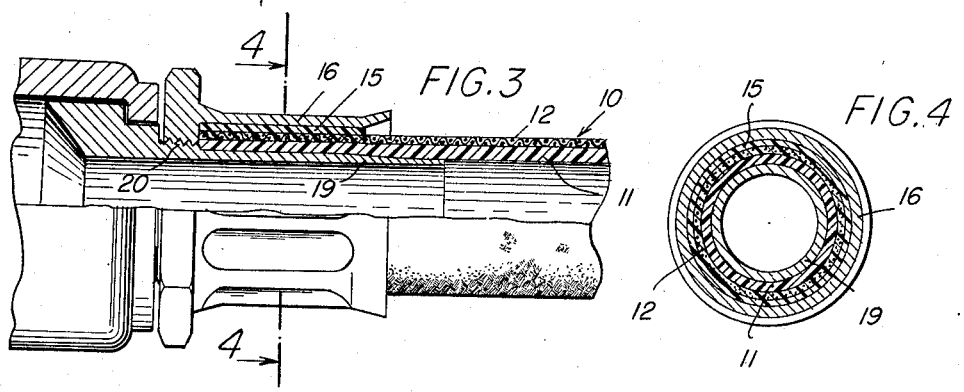
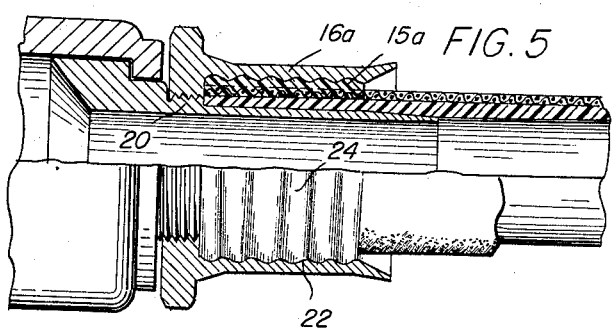
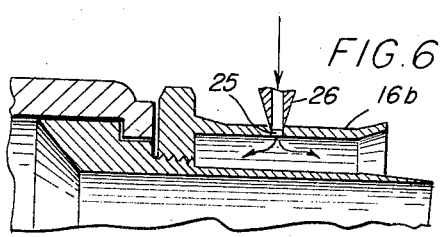

2,920,910

REINFORCED HOSE END FITTINGS

Ernst Schnabel, Limburg-Lahn, Offheimer Weg, Germany, assignor to Resistoflex Corporation, Belleville, N.J., a corporation of New York Application December 14, 1955, Serial No. 553,018

4 Claims. (Cl. 285—149)

The present invention relates to the attachment of end fittings to flexible hose having a tube of artificial resin, rubber, synthetic rubber or the like, in particular those materials which are subject to cold flow, in such a manner as to cause the lowest possible pressure to be exerted on the tube or flexible lining material of the hose and to transfer the tensile and compressive strain on the hose to an outside sheathing of the hose.

The known method of attaching end fittings to hose of rubber or synthetic materials consists in pulling the end over an inner nipple and fastening it by means of a hose clamp, ferrule or the like. This simple method of attachment is basically repeated in all methods of fastening which employ ferrules which are applied over the end and subsequently crimped from the outside or which employ screwed-in conical nipples which press the hose from the inside against the outer ferrule or in fittings wherein pressure is exerted both from within and without.

A common feature of all these methods of attachment is the fact that the hose tube material, i.e., the inner wall of the hose, is exposed to heavy pressure, with such pressure increasing in direct proportion to the rated hose pressure and the tensile strength for which the fittings are designed.

It has been established that many artificial materials or elastomers, such as polyvinyl chloride, polyvinyl alcohols, polyethylene, polytetrafluoroethylene, trifluoro-chloroethylene, silicone rubber and others change their shapes under constant pressure, even at room temperature. That is, they are subject to cold flow. At the points where pressure is exerted, the material flows out of the enclosure and the connection of the hose to the fitting is loosened.

In order to obviate this disadvantage, the invention provides a coupling wherein the force which is necessary to fasten the end fitting to the hose and the force necessary to assure fluid-tightness are separated.

Most flexible hose is provided with a metal, yarn or artificial material fabric or braid or some other outside armor in order to provide the necessary mechanical strength. For instance, if we take a hose made of polytetrafluoroethylene and provided on the outside with a steel wire braid, attachment of a fitting is customarily achieved as follows: The end of the hose is placed in a metal socket or ferrule, a nipple is inserted into the hose, and the metal ferrule is crimped from the outside. The more firmly the fitting is to be attached, the higher must be the pressure on the hose end. If there is cold flow of the hose material under such pressure, the connection eventually becomes loosened.

This phenomenon, generally known and feared among experts, is prevented according to one aspect of the invention, in the following manner:

At the cut end of the hose, there is inserted between the steel braid and the inner tube, made of polytetrafluoroethylene for example, a steel sleeve which may be of cylindrical or slightly conical shape. The thickness of this sleeve will depend upon the rated burst pressure of the hose. It may, for example, be from an average of 0.5 to 3 mm. in thickness for hose of from ¼" to 2" I.D. The length of the sleeve is approximately the same as the length of the hose end within the fitting. Said sleeve preferably has an outer surface which is slightly roughened or profiled and a smooth inner surface.

Before the steel sleeve is inserted, it is coated on the outside with a cold-hardening or thermo-setting resin binding agent, such as a polyester or other suitable synthetic resin. The wire braid for a distance equal to the length of the sleeve as well as the inside of the ferrule, which has been fashioned in the customary manner, are likewise coated with said resin binding agent. Thus, for example, if the outer ferrule is thereafter pressed against or screwed over the steel sleeve in the customary manner, a firm union between the outer casing, the wire braid and the steel sleeve is obtained upon the hardening or setting of the resin, which forms a homogeneous mass in which the braid is embedded. The hose assembly may now be exposed to considerable traction through such an end fitting without exposing the inner tube of polytetrafluoroethylene to any pull. The above-described procedure represents the first step of the attachment, according to one method of assembly.

The second step consists of rendering the fitting fluid-tight. An inner nipple, which in most cases is slightly conical or tapered, preferably having a smooth outer surface and equipped with a thread on its base portion, is rotated into the hose end and screwed into the ferrule which is provided with a threaded opening to receive the nipple. Since the inner tube is completely protected from tensile strain by the locking of the wire braid in the fitting, the nipple needs to press against the inner wall of the tube only enough to form a fluid-tight joint. In view of the fact that the inner surface of the steel sleeve is smooth, an ideal surface for the inner tube to be pressed against is obtained, which in the case of the customary wire braid or other reinforcing cover does not exist. When a tube, particularly one of thin wall section, is clamped against a wire braid it tends to cold flow into the interstices of the braid and with time is loosened. By clamping it between smooth surfaces this does not occur.

Since the pressure exerted on the inner tube no longer serves to hold the nipple in the hose against tension but serves only to form a fluid seal, such pressure may be kept much lower. Thus, the danger of cold flow of the material and of a loosening of the fitting which goes with it, is eliminated.

In the case of low-pressure hose, the steel sleeve may be dispensed with by enclosing the braid or other cover which surrounds the tube in an artificial resin capable of being hardened which may be painted on in its liquid phase, applied by dipping or by wrapping the hose end in glass fibre tape impregnated with thermoplastic resin. The liquid or heat-liquefied resin permeates the braid and fills up its interstices, flowing into contact with the outer wall of the tube. It is then hardened by chemical reaction, heating or cooling, according to its nature, and may, during this process, be enclosed in a suitable mold to give it the desired size and configuration. Threads may be molded on the resin-impregnated hose end to cooperate with an internally threaded ferrule or may be cut on it after it has been hardened. Such a hardened resin-impregnated braid end forms a smooth inner surface against which the tube may be pressed by insertion of the nipple, gripping the tube, as in the case of the inserted sleeve, between two smooth surfaces. Such a prepared hose end absorbs the major part of the pressure created by crimping a ferrule thereover without contracting the inner tube, into which the nipple is thereafter inserted.

Various illustrative embodiments of the invention are shown in the drawing, in which—

Fig. 1 is a longitudinal fragmentary view of a hose end having a fitting attached thereto in accordance with the invention, the upper half being shown in section;

Fig. 2 is a transverse section on the line 2—2 of Fig. 1;

Fig. 3 is a view similar to Fig. 1 showing a modified form of the invention in which the steel sleeve is omitted;

Fig. 4 is a transverse section on the line 4—4 of Fig. 3;

Fig. 5 is a view similar to Fig. 3 except that the ferrule is shown in section in the lower half of the figure to illustrate a modification; and Fig. 6 is a fragmentary longitudinal section through an end fitting illustrating how plastic material may be injected into a hose-receiving space of the fitting, particularly in fittings of larger sizes.

Referring to Figs. 1 and 2, the hose, generally indicated at 10, comprises a tube 11 covered by a single layer of wire braid 12. Preliminary to attaching a fitting a cylindrical steel sleeve 14 is slipped between the tube and the braid flush with the end of the hose. As stated above, this sleeve may first be covered with a hardening resin which, in liquid form, lubricates the sleeve and facilitates its insertion. The wire braid 12 surrounding sleeve 14 is shown as impregnated with and completely enclosed by a mass of resin 15 which occupies all the space between sleeve 14 and the ferrule 16.

Ferrule 16 has a threaded opening 18 in its base portion into which may be screwed the tubular nipple 19 which is provided with an externally threaded base portion 20.

In Fig. 3 similar reference numerals identify similar parts and it will be observed that the only difference from the structure shown in Fig. 1 is the omission of sleeve 14. The mass of resin 15 with which the end of the hose is impregnated extends directly into contact with the outer wall of tube 11 and, having been hardened in contact therewith, presents a smooth surface against which the end of tube 11 is pressed by the insertion of nipple 19.

Fig. 5 shows a construction similar to that of Figs. 3 and 4 except that the ferrule 16a is provided on its inner surface with a coarse rounded thread 22. This engages with complementary threads 24 on the plastic body 15a formed on the hose end either by hardening the plastic within the ferrule 16a or in a separate mold.

Particularly in the case of large size hose, having a diameter of several inches for example, plastic may be injected in a fluid state through an opening provided in the wall of the ferrule 16b, as shown at 25. 26 is a fragmentary representation of the nozzle of a suitable injection device.

Statements in the foregoing examples referring to wire braid are valid likewise for other protective hose coverings, for example, yarn, glass, artificial fibre, asbestos and other coverings.

In many cases, particularly where low-pressure conduits are involved, crimping of the ferrule may be dispensed with in view of the fact that a firm connection between the protective outer covering of the hose and the ferrule may be achieved by merely hardening the resin in the ferrule.

In the case of hose designed for high pressures, the structure is usually one having several steel wire braids built into the body of the hose, which in most instances consists of synthetic rubber. These braids are kept together by means of binding layers containing rubber. When such a hose is subjected to pulsations or flexing, the wires of the braid move scissors-fashion upon each other even where the end of the hose is inserted into the end fitting and is pressed against from the inside by the nipple or from the outside by the ferrule. These forces are sufficiently strong to cause the inner tube as well as the rubber-containing binding layers between the steel wire braids to be pressed into such wire braids and thus to be weakened. In addition, these layers are apt to cold flow under pressure as time goes on and thus the connection is loosened.

It has been established that a completely rigid end may be obtained by imbedding a section of externally bared braid layers at the end of the hose in artificial resin having a very high strength, such as polyesters or others. Thereby, the individual braid layers are immobilized. At the same time, a pressure piece is obtained which virtually becomes an element of the fitting. On the end of a hose thus imbedded in resin, external threads may be cut so that a ferrule may be screwed onto it. In order to create a firm bond between the end of the hose thus treated and a ferrule, the hose end and the inner part of the ferrule may be coated further with self-hardening resin before assembly, then connected together and allowed to harden.

In all the cases described above, the braid is filled with hardening artificial resin, in such a manner as to prevent the material of the inner tube from pressing into or through the braid under pressure.

The desired rigid end piece of the hose, ready to be attached, may also be obtained by hot-pressing artificial resin with or without filler, in particular a fibrous filler, by means of a mould consisting of several parts, positioned around the end of the hose, or by penetrating and filling up all hollow spaces of the braid with artificial resin, using the injection moulding method under pressure.

An additional technical advantage of this method of attaching fittings to high-pressure hose resides in the fact that the nipple, which has a tapered end for insertion in the hose, need no longer be screwed in under such high pressure to effect a fluid-tight seal.

As above described, the pressure and traction are absorbed by the end casing which together with the braids forms a unit which becomes part of the fitting. The function of the nipple is limited to fluid-tight sealing. In this case, the normally unavoidable lubricating with graphite oil of the nipple during insertion, which is most unsuitable for operational use, may be dispensed with. Although it is true that the nipple is screwed in more easily if oil is used, it is likewise true that afterwards it has a tendency to slip out since the graphite-oil mixture remains a foreign substance between the inner tube and nipple.

For use with rubber and synthetic rubbers it has been found that polyesters, epoxy and other synthetic resins are excellently suited for use as lubricating agents, instead of the graphite-oil mixture, to facilitate screwing in of the nipple. These resins, which contain the usual hardening agents, having first been used as lubricating agents, afterward form a hard compact mass which adheres to rubber very well and thus adds to the fastening of the nipple within the hose.

Referring to Figs. 1 and 5, if both sleeve 14 and a threaded socket or ferrule such as 16a are given a slight conical taper, like a pipe thread, toward the base of the fitting, a reusable fitting is produced which firmly grips the hose end and which can be easily disassembled.

The invention is of particular utility where the hose has a thin-walled tube of material subject to cold flow, such as polytetrafluoroethylene. The advantages are due to a combination of features, in particular eliminating localized pressure points on the tube by filling up the interstices of the braid with hardened resin, gripping the tube end between two smooth surfaces, reducing the pressure on the tube to prevent cold flow and immobilization of the braid within the fitting by embedding it in hardened resin.

It is to be understood that the foregoing detailed description of specific embodiments of the invention is merely for purposes of illustration and that the invention is to be construed in accordance with the claims.

What is claimed is:

1. In combination, a hose having a tube of non-metallic resinous material subject to cold flow under pressure and an outer reinforcing covering thereon having interstices therein, a hardened mass of inflexible rigid resin having an inner surface portion rigidly embedding the end of said covering and forming a smooth surface in contact with the outer wall of said tube, said mass having an outer surface portion, a socket surrounding said mass of resin at the hose end and crimped upon and mechanically interlocked with said outer surface portion, a nipple having a smooth outer surface inserted in said tube and compressing the tube against the smooth surface of said rigid mass, and means interconnecting said socket and said nipple.

2. In combination, a hose having a polytetrafluoroethylene tube and a braided wire reinforcing covering thereon, a tubular metal sleeve inserted between the ends of said tube and said covering, said sleeve having a smooth inner surface in contact with the outer wall of said tube, a hardened mass of inflexible rigid resin having an inner surface portion rigidly embedding the end of said covering where it surrounds said sleeve to form a rigid body, said mass having an outer surface portion, a socket encircling said rigid body and crimped upon and mechanically interlocked with said outer surface portion, a nipple having a smooth outer surface inserted in the end of said tube and compressing the tube against said sleeve, and means for interconnecting said socket and said nipple.

3. In combination, a hose having a polytetrafluoroethylene tube and a braided wire reinforcing covering thereon, a hardened mass of inflexible rigid resin having an inner surface portion rigidly embedding the end of said covering and forming a smooth surface in contact with the outer wall of said tube, said mass having an outer surface portion, a socket surrounding said mass of resin at the hose end and mechanically interlocked with said outer surface portion of said rigid mass, a nipple having a smooth outer surface inserted in said tube and compressing the tube against the smooth surface of said rigid mass, and means interconnecting said socket and said nipple.

4. The combination according to claim 1, wherein said mass has an axial length substantially coextensive with the overlapping region of said nipple and said socket.

References Cited in the file of this patent
UNITED STATES PATENTS

| | | |
|---|---|---|
| 889,956 | Nikonow | June 9, 1908 |
| 1,762,548 | Davis | June 30, 1930 |
| 2,211,446 | Troshkin | Aug. 13, 1940 |
| 2,309,719 | Vaill | Feb. 3, 1943 |
| 2,321,991 | Butler | June 15, 1943 |
| 2,394,632 | Parker | Feb. 12, 1946 |
| 2,406,235 | McCoy | Aug. 20, 1946 |
| 2,428,189 | Wolfram | Sept. 30, 1947 |
| 2,430,921 | Edelmann | Nov. 18, 1947 |
| 2,550,583 | Millar | Apr. 24, 1951 |
| 2,561,351 | Fentress | July 24, 1951 |
| 2,685,458 | Shaw | Aug. 3, 1954 |
| 2,685,459 | Panagrossi | Aug. 3, 1954 |
| 2,731,279 | Main | Jan. 17, 1956 |
| 2,770,476 | Cleverly | Nov. 13, 1956 |
| 2,829,671 | Ernst | Apr. 8, 1958 |